June 26, 1956 R. H. AIRES 2,752,528

WAVEFORM CONTROL FOR TELEVISION DEFLECTION SYSTEM

Filed March 10, 1951

INVENTOR.
RAMON H. AIRES
BY
Brown, Denk & Synnestvedt
AGENTS

United States Patent Office 2,752,528

Patented June 26, 1956

2,752,528

WAVEFORM CONTROL FOR TELEVISION DEFLECTION SYSTEM

Ramon H. Aires, Philadelphia, Pa., assignor to Philco Corporation, Philadelphia, Pa., a corporation of Pennsylvania Application March 10, 1951, Serial No. 214,971

1 Claim. (Cl. 315—27)

Figure 1:
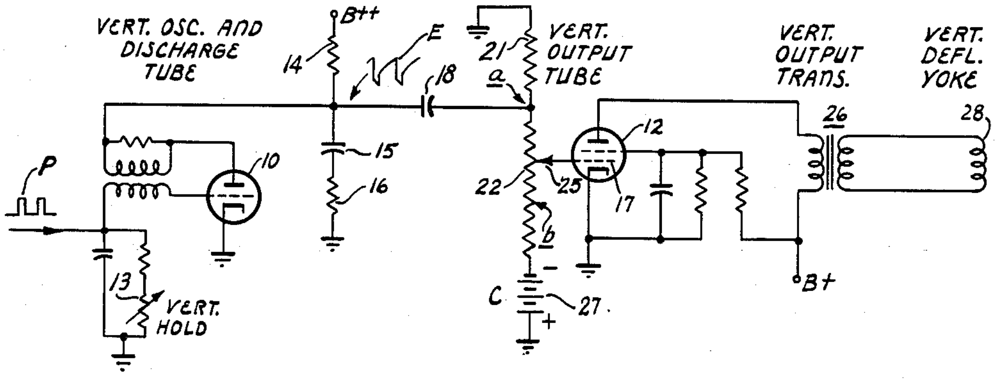

The invention herein described and claimed relates to television deflection systems, and particularly to means for controlling the waveform of the deflection-amplifier output signal as a function of the amplitude of the input signal.

More particularly, this invention is directed to the vertical deflection system of a television receiver, and is concerned with adjustment of the picture height and maintenance of vertical linearity.

As is well known, at the low frequency of the vertical-deflection signal conventionally employed in a television receiver (60 cycles per second), the vertical-deflection yoke looks resistive as well as inductive, and in order to obtain a sawtooth of current through the yoke, it is necessary to apply thereto a composite voltage waveform having a sawtooth component as well as a square wave or pulse component. The sawtooth component of the composite waveform is ordinarily developed in the circuit of the vertical blocking oscillator and discharge tube by the charge and discharge of a capacitor, and the slopes of the sawtooth component tend, therefore, to be exponential rather than linear. As applied to the vertical-deflection system, the present invention is concerned primarily with the positive slope of the sawtooth, this being the slope which corresponds to the scanning portion of the cathode-ray-beam deflection. The negative slope corresponds to the retrace portion of the deflection cycle and its linearity is of little or no importance.

In most television receivers, the sawtooth signal developed by the vertical blocking oscillator and discharge tube is amplified by a so-called vertical output tube prior to application to the vertical output transformer and vertical deflection yoke. The prior art recognized that, by operating the vertical output tube at a proper point on its grid-voltage plate-current characteristic, the exponential curvature of the positive slope of the sawtooth deflection voltage (developed by the vertical blocking oscillator and discharge tube and applied to the grid of the output tube) could be modified and given such shape in the plate circuit of the output tube that the current through the vertical deflection yoke would increase in a substantially linear manner. The prior art was also aware that when the magnitude of the sawtooth voltage applied to the grid of the output tube is varied by adjustment of the picture-height control, the shape of the deflection signal in the plate circuit of the output tube becomes altered, unless the grid bias is adjusted, and that, to maintain the same shape of deflection signal which obtained prior to adjustment of the height control, it is necessary to operate at a different point on the output tube's characteristic.

In view of the above, prior-art television receivers conventionally include, among the so-called non-operating controls, a picture-height control which controls the magnitude of the vertical-deflection signal applied to the grid of the vertical output tube, and a vertical-linearity control which controls the bias on the output tube. Thus, when the picture height is changed by adjusting the height control, thereby unintentionally disturbing the vertical linearity of the picture, the operator may restore the linearity by adjusting the vertical-linearity control. Unfortunately, adjustment of the vertical-linearity control affects the height of the picture, and it may, therefore, be necessary to readjust the height control. This in turn may make it necessary to readjust the vertical-linearity control. In short, in conventional television receivers, because adjustment of one affects the other, a considerable amount of alternate readjustment of the two controls may be necessary in order to obtain a picture of desired height and good linearity. Such readjustments are objectionable to the user in the home and are particularly time consuming and objectionable in the initial alignment of the receiver on the production line of the manufacturer.

An object of the present invention is, therefore, to provide, in a television deflection system, means for controlling the shape of the deflection-amplifier output signal as a function of the adjustment of the amplitude of a controllable input signal.

Another object is to provide, in a deflection amplifier system, means for varying the shape of the deflection-amplifier output signal as a function of the adjustment of the amplitude of a controllable input signal while maintaining the input impedance relatively constant.

A further object is to provide, in a television receiver, control means which may be manually adjusted to change the height of the picture without disturbing the vertical linearity.

A more specific object is to provide, in a television receiver, means effective when the picture-height control is manually adjusted to adjust automatically the vertical linearity of the picture.

In accordance with the present invention, these objects are achieved by applying the non-linear vertical-deflection (or other non-linear alternating-current) signal across the terminals of the fixed resistive element of a potentiometer. The portion of the signal appearing between the potentiometer's movable-contact terminal and the fixed terminal at one end of the resistive element is applied through conductive means to the input elements of an amplifier tube having a grid-voltage plate-current characteristic which is non-linear in that the incremental increase in plate current decreases as the grid bias is made more negative. A direct-current biasing voltage of preselected magnitude is also applied across the fixed resistive element of the potentiometer in such polarity that the potentiometer terminal which is connected to the grid of the tube is at the higher D.-C. potential. Then, when the movable-contact terminal is adjusted to increase (or decrease) the amplitude of the signal applied to the tube, the bias is decreased (or increased) to an extent necessary to maintain a predetermined amount of linearity in the output-signal waveform.

The foregoing will be better understood from the following detailed description of a preferred embodiment of the invention as applied to the vertical-deflection system of a television receiver.

Figure 2:
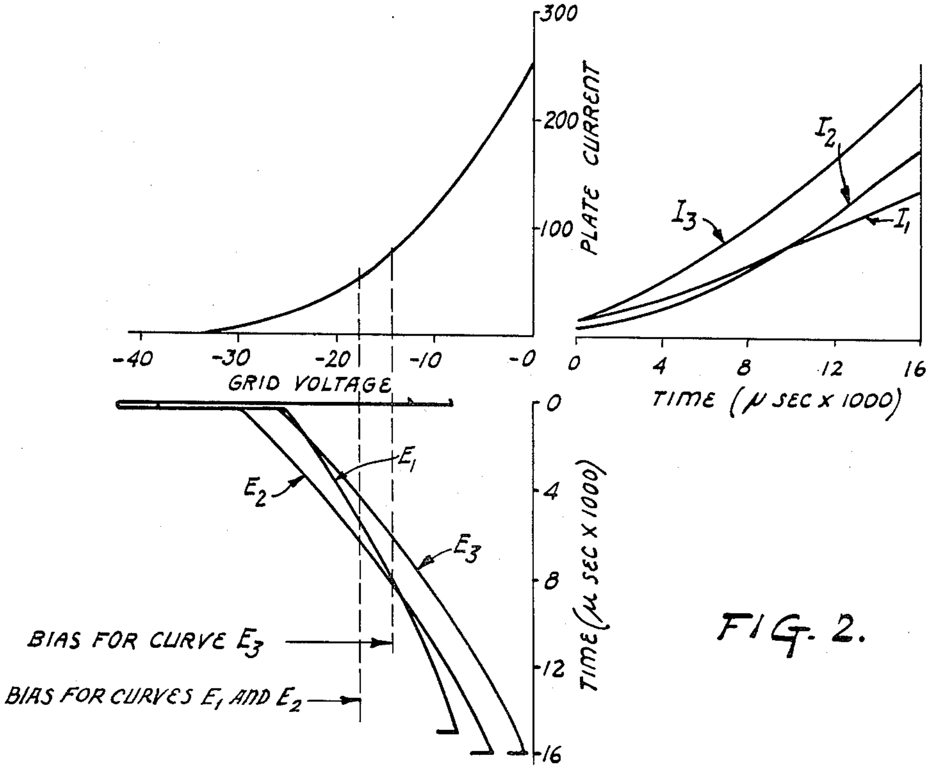

In the drawing, Figure 1 shows a vertical-deflection circuit in which the present invention has been incorporated; and Figure 2 is a graphical representation which will be helpful in explaining the invention.

In Figure 1, tube 10 is the vertical blocking oscillator and discharge tube and tube 12 is the vertical output tube. The oscillator is triggered by the vertical sync pulses P applied to the grid of tube 10, the free-running frequency of the oscillator being controlled by the variable grid resistor 13 functioning as the so-called vertical-hold control. The vertical-deflection signals are developed across capacitor 15 and resistor 16 and have the usual generally-sawtooth waveform indicated in the drawing by waveform E. Resistor 14, in the plate-voltage supply, is much larger than resistor 16 and the combination of resistor 14 and capacitor 15 largely determine the scanning slope of the sawtooth waveform. The circuit described thus far is conventional and need not be discussed in greater detail.

In accordance with the present invention, the deflection signals E developed across capacitor 15 and resistor 16 are applied, as by way of the coupling capacitor 18, across the fixed resistive element of a potentiometer 22, the adjustable contact arm 25 of which is connected conductively to grid 17 of tube 12. A source of negative direct-current biasing potential, represented in Figure 1 by the C battery 27, is connected to the lower end of the potentiometer 22. A conductive impedance, represented in Figure 1 by the resistor 21, is connected between the upper end of potentiometer 22 and ground. Resistor 21 provides the return path for the direct current from battery 27, and its resistance is made sufficiently high to keep the upper end of the potentiometer 22 well above ground potential, thereby preventing the D.-C. return path from acting as a low-impedance bypass to the vertical-deflection signals. In addition, the value of resistor 21 is so chosen that, when combined with potentiometer 22 and bias battery 27, a predetermined amount of negative biasing voltage is developed at each point along the resistive element of potentiometer 22, from the upper end (point *a*) to the lowest point (point *b*) to which the contact arm 25 is movable.

It will be seen that, by the arrangement shown in Figure 1 and described above, a controllable portion of the vertical-deflection signal appearing across the resistive element of the potentiometer 22 is applied, by way of adjustable arm 25, to the input of tube 12. Moreover, since the arm 25 is connected conductively to the grid 17, the position of arm 25 determines, not only the magnitude of the vertical-deflection signal applied to the grid 17, but also the magnitude of the D.-C. bias.

In Figure 2, I have shown an illustrative grid-voltage plate-current characteristic for vertical output tube 12. The particular characteristic shown is that of a 6BQ6 tube with 125 volts on the screen grid, but other tubes and other screen or plate voltage may, of course, be used. The input-signal curves $E_1$, $E_2$, and $E_3$ correspond to the sweep portions of sawtooth vertical-deflection voltages applied to the grid of the output tube 12, while the curves $I_1$ $I_2$, and $I_3$ represent the plate currents which flow when input signals $E_1$, $E_2$, and $E_3$, respectively, are applied.

Let us see what happens when the bias on the tube is held fixed but the amplitude of the input signal is changed (which is what happens in the prior-art television receiver when the height control is varied). In Figure 2, the grid bias for input-signal curve $E_1$ is the same as for curve $E_2$ but the input signal is larger for $E_2$. Hence, curve $E_2$ may be deemed to represent the condition which exists in the prior-art receiver when the height control is adjusted to give a picture of increased height, with curve $E_1$ representing the input signal obtaining prior to adjustment of the control. Note that during the last portion of the vertical-scanning period (which correspond to the bottom portion of the picture) the plate-current curve $I_2$ is much steeper than $I_1$. This shows that when the picture-height control is adjusted to increase the picture height, the lower portion of the picture becomes stretched relative to the upper portion. Thus, the upper portion appears squeezed. To correct this condition, it is necessary to increase the slope of the plate-current curve $I_2$ in the first portion of the scan. This can be done by decreasing the bias, as is indicated in Figure 1 by curves $E_3$ and $I_3$, where $E_3$ represents an input signal whose magnitude is the same as that of $E_2$, but whose operating point on the tube characteristic is different, the bias being smaller. It will be seen that the plate current $I_3$ which results from the applied input signal $E_3$ is substantially more linear than is the plate current $I_2$. The curve $I_3$ is not, however, entirely linear; nor is it intended to be, as will now be discussed.

In the case of the vertical-deflection system, the end objective is, of course, to obtain a substantially linear deflection vertically of the cathode-ray beam. To achieve this result, the current in the secondary of the vertical output transformer 26 should increase in a substantially linear manner. However, this does not mean that the current in the primary of the output transformer (which is also the plate current of the output tube) should increase linearly. The primary current should, however, have a definite wave shape determined by the electrical properties of the vertical output transformer 26 and deflection yoke 28. Ordinarily, an upwardly-concave waveform of current (i. e. a current having an increasing rate of rise) is needed in the primary of the output transformer to produce a linearly rising current in the secondary.

Returning now to Figure 1, it will be seen that when contact arm 25 is moved upwardly to increase the picture height, the bias on tube 12 is decreased, and that when the arm 25 is moved downwardly to decrease the picture height, the bias is increased. Thus, in each case, the bias is changed in the proper direction. I have found that by a proper choice of values for bias-voltage source 27, potentiometer 22, and resistor 21, the value of grid bias necessary to maintain the plate-current rise in output tube 12 of approximately proper curvature to produce substantially linear vertical deflection may be obtained, not only when the movable contact arm 25 is at the two extreme positions *a* and *b*, but also when the contact arm is at intermediate positions between *a* and *b*.

To determine the values required to accomplish the foregoing results, the following procedure may be used: First, select values for resistor 14 and capacitor 15 which will develop a vertical-deflection signal of sufficient amplitude to produce a picture of desired maximum height when the movable arm 25 is set at point *a*. Next, note the value of grid bias necessary at point *a* to produce a linear picture when the maximum deflection signal is applied. Next, select the minimum value of potentiometer resistance which will produce the desired minimum picture height, and place a stop on the resistive element of the potentiometer at that point, point *b* in Figure 1. (In practice, it will ordinarily be more convenient to connect a fixed resistor between the lower end of the potentiometer and the bias batery 27.) Next, note the value of grid bias necessary at point *b* to produce a linear picture when the deflection signal is minimum. Then select values for bias battery 27 and resistor 21 which, in combination with potentiometer 22, will provide the required biases at points *a* and *b*. The biases at intermediate points between *a* and *b* will then be found to be of approximately proper value to produce the desired linearity of beam deflection vertically.

The following values are given as illustrative of values which have been used successfully in the circuit of Figure 1:

| | |
|---|---|
| Tube **12** | 6BQ6GT. |
| Bias source **27** (C−) | −32 volts. |
| Potentiometer **22** | 0.5 meg. (bet. *a* and *b*). |
| Potentiometer **22** | 0.5 meg. (bet. *b* and C−). |
| Resistor **21** | 1.8 meg. |
| Capacitor **18** | 0.22 mfd. |
| Voltage source B++ | 375 volts. |
| Resistor **14** | 3.3 meg. |
| Capacitor **15** | 0.047 mfd. |
| Resistor **16** | 1000. ohms. |

It will be understood, of course, that the values given above are by way of example only, and are not intended to be limiting.

I wish to mention several important advantages which are derived from the particular circuit arrangement shown in Figure 1. One advantage is that the frequency response of the circuit is not altered when the potentiometer tap is varied, due to the fact that the impedance presented to output signals from tube 10 remains substantially fixed irrespective of the position of the movable tap 25. Another advantage is that the free-running frequency of the blocking oscillator remains relatively unchanged when the height control (potentiometer 22) is adjusted.

It will be understood that while I have shown, in Figure 1, the preferred arrangement wherein the potentiometer's movable tap is connected to the grid of the tube, it may be desirable in some instances to connect the tap to the cathode and to connect the grid to the fixed terminal at the high potential end of the resistive element (point *a*). In this case, it would be necessary, ordinarily at least, to connect a source of biasing potential in the cathode-grid circuit to maintain the grid at a negative potential relative to the cathode.

It will be seen from the foregoing description that I have provided means usable to particular advantage in the vertical-deflection system of a television receiver whereby, when the picture-height is varied by manual adjustment of the picture-height control, the vertical linearity of the picture is maintained. The invention may, however, also be used advantageously in horizontal-deflection systems and in other circuits.

Having described my invention, I claim:

In a vertical deflection system for a television receiver, a vertical deflection circuit to which a substantially sawtooth current must be supplied to effect substantially linear vertical deflection, it being necessary to provide for adjustment of the amplitude of said current in order to enable adjustment of picture height, a grid-controlled driver tube having its output circuit coupled to said deflection circuit, said tube inherently having a non-linear grid voltage-plate current characteristic necessitating application to its control grid of a non-linear deflection signal to produce a substantially linear plate current, and also necessitating change of bias on the control grid, whenever the amplitude of said signal is changed, in order to maintain the substantially linear form of the plate current, a source of said signal, a pair of resistances and a source of D.-C. biasing potential serially connected across said signal source, one of said resistances being interposed between the negative terminal of said biasing source and the other resistance, means connecting the positive terminal of said biasing source to the cathode of said tube, an adjustable tap on said other resistance connected to the control grid of said tube, and means providing a return path for current flowing from said biasing source through said resistances to apply a variable bias to the control grid of said tube according to the adjustment of said tap, said one resistance determining the miinmum amplitude of said signal and consequently the minimum picture height, and said other resistance determining the maximum amplitude of said signal and consequently the maximum picture height, the adjustment of said tap effecting adjustment of the picture height between the maximum and minimum heights and also effecting the necessary adjustment of said grid bias to maintain the substantially linear form of the plate current of said tube.

References Cited in the file of this patent

UNITED STATES PATENTS

| | | |
|---|---|---|
| 2,036,892 | Smiley | Apr. 7, 1936 |
| 2,074,033 | Tolson | Mar. 16, 1937 |
| 2,233,767 | Bouman et al. | Mar. 4, 1941 |
| 2,235,040 | Penner | Mar. 18, 1941 |
| 2,611,029 | Bailey | Sept. 16, 1952 |